(12) United States Patent
Kondo et al.

(10) Patent No.: US 8,875,684 B2
(45) Date of Patent: Nov. 4, 2014

(54) EVAPORATED FUEL TREATMENT DEVICE FOR MOTORCYCLE

(75) Inventors: Nobuyuki Kondo, Wako (JP); Hiroshi Inaoka, Wako (JP); Teruhide Yamanishi, Wako (JP); Kazuo Fujihara, Wako (JP); Toshinao Takigawa, Wako (JP); Toshiyuki Hyodo, Wako (JP); Masaaki Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 413 days.

(21) Appl. No.: 13/424,944

(22) Filed: Mar. 20, 2012

(65) Prior Publication Data

US 2012/0240905 A1   Sep. 27, 2012

(30) Foreign Application Priority Data

Mar. 22, 2011   (JP) .................. 2011-063113

(51) Int. Cl.
*F02M 33/02* (2006.01)
*B62J 35/00* (2006.01)
*B62J 37/00* (2006.01)

(52) U.S. Cl.
CPC . *B62J 37/00* (2013.01); *B62J 35/00* (2013.01)
USPC .......................................... 123/518; 123/519

(58) Field of Classification Search
CPC ........ B62J 37/00; B62J 35/00; F02M 25/089; F02M 25/0872; F02M 35/162
USPC .................. 123/516, 518–520, 522, 468, 469
See application file for complete search history.

(56) References Cited

U.S. PATENT DOCUMENTS

| 6,802,430 B2* | 10/2004 | Tomimura et al. | 220/562 |
|---|---|---|---|
| 2002/0038653 A1* | 4/2002 | Kobayashi et al. | 123/509 |
| 2006/0086404 A1* | 4/2006 | Wu | 141/59 |
| 2010/0224172 A1* | 9/2010 | Kusa | 123/520 |
| 2010/0242925 A1* | 9/2010 | Yoshida et al. | 123/519 |
| 2010/0243355 A1* | 9/2010 | Hosoya et al. | 180/69.4 |
| 2011/0024214 A1* | 2/2011 | Seki et al. | 180/69.4 |
| 2011/0073399 A1* | 3/2011 | Seki | 180/219 |

FOREIGN PATENT DOCUMENTS

JP   4108954 B2   6/2008

* cited by examiner

*Primary Examiner* — Thomas Moulis
*Assistant Examiner* — Joseph Dallo
(74) *Attorney, Agent, or Firm* — Westerman, Hattori, Daniels & Adrian, LLP

(57) ABSTRACT

A charge pipe passage includes a first tank-side pipe passage part which is connected to an upper surface of a fuel tank, and a second tank-side pipe passage part which is connected with the first tank-side pipe passage part and extends toward the other side of the fuel tank from one side of the fuel tank in the vehicle widthwise direction on an end portion thereof on a fuel tank side, and the first and second tank-side pipe passage parts, are fixed to the upper surface of the fuel tank.

13 Claims, 12 Drawing Sheets

EVAPORATED FUEL TREATMENT DEVICE FOR MOTORCYCLE

CROSS-REFERENCE TO RELATED APPLICATION

The present application claims the benefit of priority to Japanese Patent Application No. 2011-063113, filed on Mar. 22, 2011, the entire content of which is incorporated by reference.

TECHNICAL FIELD

The present disclosure relates to a motorcycle which includes: an engine which generates power for driving a rear wheel; a fuel tank which stores fuel to be supplied to the engine; a fuel absorption means which is arranged below an upper surface of the fuel tank so as to absorb a fuel gas evaporated in the fuel tank outside the fuel tank; and a charge pipe passage which introduces a fuel gas to the fuel absorption means from the fuel tank, and more particularly to the improvement of an evaporated fuel treatment device.

BACKGROUND OF THE INVENTION

There has been known a motorcycle which introduces a fuel gas generated in a fuel tank into a canister arranged at an oblique frontward and downward position from the fuel tank through a charge pipe passage in Japanese Patent No. 4108954.

SUMMARY OF THE INVENTION

However, in the motorcycle disclosed in Japanese Patent No. 4108954, the charge pipe passage is connected to the canister only along a left side of the motorcycle from an upper surface of the fuel tank and hence, when the motorcycle falls leftward, there exists a possibility that a large amount of fuel flows out from the fuel tank toward a canister side.

The present disclosure has been made in view of the above-mentioned circumstances, and it is an object of the present disclosure to provide an evaporated fuel treatment device for a motorcycle which can suppress the flowout of fuel from a fuel tank toward a fuel absorption means side when the motorcycle falls.

To achieve the above-mentioned object, according to the first technical feature of the present disclosure, there is provided an evaporated fuel treatment device for a motorcycle which includes: an engine which generates power for driving a rear wheel; a fuel tank which stores fuel to be supplied to the engine; a fuel absorption means which is arranged below an upper surface of the fuel tank so as to absorb a fuel gas evaporated in the fuel tank outside the fuel tank; and a charge pipe passage which introduces a fuel gas to the fuel absorption means from the fuel tank, wherein the charge pipe passage includes a first tank-side pipe passage part which is connected to the upper surface of the fuel tank, and a second tank-side pipe passage part which is communicably connected with the first tank-side pipe passage part and extends toward the other side of the fuel tank from one side of the fuel tank in the vehicle widthwise direction on an end portion thereof on a fuel tank side, and the first tank-side pipe passage part and the second tank-side pipe passage part are fixed to the upper surface of the fuel tank.

The present disclosure also has, in addition to the first technical feature, the second technical feature that the first tank-side pipe passage part extends toward the one side of the fuel tank from a connection part connected to the upper surface of the fuel tank in the vehicle widthwise direction, and is communicably connected to the second tank-side pipe passage part.

The present disclosure also has, in addition to the second technical feature, the third technical feature that a fuel filling port is formed in the upper surface of the fuel tank on the one side in the vehicle widthwise direction, and the first tank-side pipe passage part which is connected to the upper surface of the fuel tank at a position offset from the fuel filling port and the second tank-side pipe passage part are communicably connected to each other in a state where the first tank-side pipe passage part and the second tank-side pipe passage part surround the periphery of the fuel filling port.

The present disclosure also has, in addition to the third technical feature, the fourth technical feature that a tray which receives fuel spilt from the fuel filling port is arranged around the fuel filling port, and a part of the first tank-side pipe passage part and a part of the second tank-side pipe passage part are arranged to pass below the tray.

The present disclosure also has, in addition to any one of the first to fourth technical features, the fifth technical feature that the charge pipe passage includes a third tank-side pipe passage part which is connected to the second tank-side pipe passage part on the other side in the vehicle widthwise direction and has a highest part arranged at a highest position of the charge pipe passage at an intermediated position thereof.

The present disclosure also has, in addition to the fifth technical feature, the sixth technical feature that a part of the third tank-side pipe passage part which includes at least the highest part is formed of an elastic tube, and the highest part of the elastic tube is supported on a highest part support part mounted on the fuel tank from below.

The present disclosure also has, in addition to the fifth or sixth technical feature, the seventh technical feature that a part of the charge pipe passage ranging from the highest part to the connection part connected to the fuel tank is arranged with a downward gradient toward the connection part.

The present disclosure also has, in addition to any one of the fifth to seventh technical features, the eighth technical feature that the fuel absorption means is a crankcase which stores oil for absorbing the fuel gas and constitutes a part of the engine, a downstream end of the charge pipe passage is connected to the crankcase in a state where the downstream end of the charge pipe passage opens in the oil, and a first check valve which prevents a backflow of a fuel gas toward the fuel tank is interposed on the charge pipe passage downstream of the highest part in a state where the first check valve is supported on the fuel tank.

The present disclosure also has, in addition to the eighth technical feature, the ninth technical feature that the upper surface of the fuel tank includes a higher part in which the fuel filling port is formed and a lower part lower than the higher part, and the first check valve is arranged on the lower part.

The present disclosure also has, in addition to the ninth technical feature, the tenth technical feature that the lower part is formed in a downwardly inclined manner toward a crankcase side.

The present disclosure also has, in addition to any one of the eighth to tenth technical features, the eleventh technical feature that an atmospheric air introducing pipe passage which introduces atmospheric air to the inside of the fuel tank is connected to a branch part which is formed on the charge pipe passage at a position closer to the fuel tank side than the first check valve, and a second check valve which prevents the flow of a fuel gas from the fuel tank side is interposed on the atmospheric air introducing pipe passage.

The present disclosure also has, in addition to any one of the first to eleventh technical features, the twelfth technical feature that a part of the elastic tube which constitutes at least a part of the charge pipe passage and is arranged above the fuel tank is held by an upper open clamper which is mounted on the upper surface of the fuel tank, and the fuel tank is covered with a tank cover which prevents the removal of the elastic tube from the upper open clamper from above.

The present disclosure also has, in addition to any one of the first to twelfth technical features, the thirteenth technical feature that paint treatment is applied to an outer surface of the fuel tank, and a metallic pipe which constitutes a part of the charge pipe passage is fastened to the fuel tank.

According to the first technical feature of the present disclosure, the first tank-side pipe passage part which is connected to the upper surface of the fuel tank and the second tank-side pipe passage part which extends toward the other side of the fuel tank from the one side of the fuel tank in the vehicle widthwise direction and is communicably connected with the first tank-side pipe passage part constitute a part of the charge pipe passage and are fixed to the upper surface of the fuel tank. Accordingly, even when the first tank-side pipe passage part is connected to the fuel tank at either one of positions in the vehicle widthwise direction, it is possible to suppress an amount of fuel which flows out from the fuel tank toward the fuel absorption means side through the charge pipe passage when the motorcycle falls. Further, at least the part of the charge pipe passage is mounted on the fuel tank in advance and hence, the structure can contribute to the enhancement of assembling property.

According to the second technical feature of the present disclosure, the first tank-side pipe passage part which extends toward the one side of the fuel tank from the connection part thereof connected to the upper surface of the fuel tank in the vehicle widthwise direction is connected to the second tank-side pipe passage part and hence, the flowout of fuel when the motorcycle falls can be effectively suppressed.

According to the third technical feature of the present disclosure, the fuel filling port is formed in the upper surface of the fuel tank on the one side in the vehicle widthwise direction, and the first tank-side pipe passage part and the second tank-side pipe passage part are connected to each other in a state where the first tank-side pipe passage part and the second tank-side pipe passage part surround the periphery of the fuel filling port. Accordingly, the part of the first tank-side pipe passage part and the part of the second tank-side pipe passage part can be arranged with large curvatures respectively by making use of a dead space around the fuel filling port thus easing the arrangement of the first tank-side pipe passage part and the second tank-side pipe passage part.

According to the fourth technical feature of the present disclosure, the part of the first tank-side pipe passage part and the part of the second tank-side pipe passage part pass below the tray which is arranged around the fuel filling port. Accordingly, even when the part of the first tank-side pipe passage part and the part of the second tank-side pipe passage part are arranged so as to surround the fuel filling port, an area of the tray can be increased.

According to the fifth technical feature of the present disclosure, the third tank-side pipe passage part which is connected to the second tank-side pipe passage part on the other side in the vehicle widthwise direction has the highest part arranged at the highest position of the charge pipe passage at the intermediated position thereof. Accordingly, the flowout of fuel when the motorcycle falls can be more effectively suppressed.

According to the sixth technical feature of the present disclosure, the part of the third tank-side pipe passage part which includes at least the highest part is formed of the elastic tube, and the highest part of the elastic tube is supported on the highest part support part mounted on the fuel tank from below. Accordingly, the degree of freedom in design can be enhanced by determining the height of the highest part based on the height of the highest part support part.

According to the seventh technical feature of the present disclosure, the part of the charge pipe passage ranging from the highest part to the connection part with the fuel tank is arranged with a downward gradient. Accordingly, fuel stored in the charge pipe passage between the highest part and the fuel tank can be easily returned to the fuel tank side.

According to the eighth technical feature of the present disclosure, the crankcase of the engine constitutes the fuel absorption means by which a fuel gas is absorbed in oil, and the first check valve which prevents a backflow of a fuel gas toward the fuel tank is interposed on the charge pipe passage downstream of the highest part. Accordingly, it is possible to effectively prevent oil in the crankcase from flowing toward the fuel tank by the use of the first check valve, and it is also possible to enhance assembling property by supporting the first check valve on the fuel tank.

According to the ninth technical feature of the present disclosure, the upper surface of the fuel tank includes the higher part in which the fuel filling port is formed and the lower part lower than the higher part, and the first check valve is arranged on the lower part. Accordingly, it is possible to prevent the first check valve from taking a high arrangement position.

According to the tenth technical feature of the present disclosure, the lower part is formed in a downwardly inclined manner toward the crankcase. Accordingly, it is possible to make the flow of a fuel gas which passes through the first check valve smooth.

According to the eleventh technical feature of the present disclosure, the branch part is formed on the charge pipe passage at the position closer to the fuel tank side than the first check valve, and the atmospheric air introducing pipe passage which introduces an atmospheric air to the inside of the fuel tank and on which the second check valve which prevents the flow of a fuel gas from the fuel tank side is interposed is connected to the branch part. Accordingly, when the pressure inside the fuel tank becomes a negative pressure, atmospheric air is introduced into the inside of the fuel tank so as to adjust the pressure in the fuel tank to an atmospheric pressure. Further, it is possible to prevent a fuel gas from being discharged to the outside through the atmospheric air introducing pipe passage by the second check valve.

According to the twelfth technical feature of the present disclosure, the upper open clamper which holds the part of the elastic tube which is arranged above the fuel tank out of the elastic tube which constitutes at least the part of the charge pipe passage is mounted on the upper surface of the fuel tank, and the tank cover which prevents the removal of the elastic tube from the upper open clamper is arranged such that the fuel tank is covered with the tank cover from above. Accordingly, the part of the charge pipe passage can be supported on the fuel tank with the simple structure and hence, the assembling property can be enhanced.

Further, according to the thirteenth technical feature of the present disclosure, paint treatment is applied to the outer surface of the fuel tank, and the metallic pipe which constitutes the part of the charge pipe passage is fastened to the fuel tank. Accordingly, compared to a case where the metallic pipe is fixed to the fuel tank by welding, it is unnecessary to apply masking to the metallic pipe and hence, a painting cost can be reduced.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
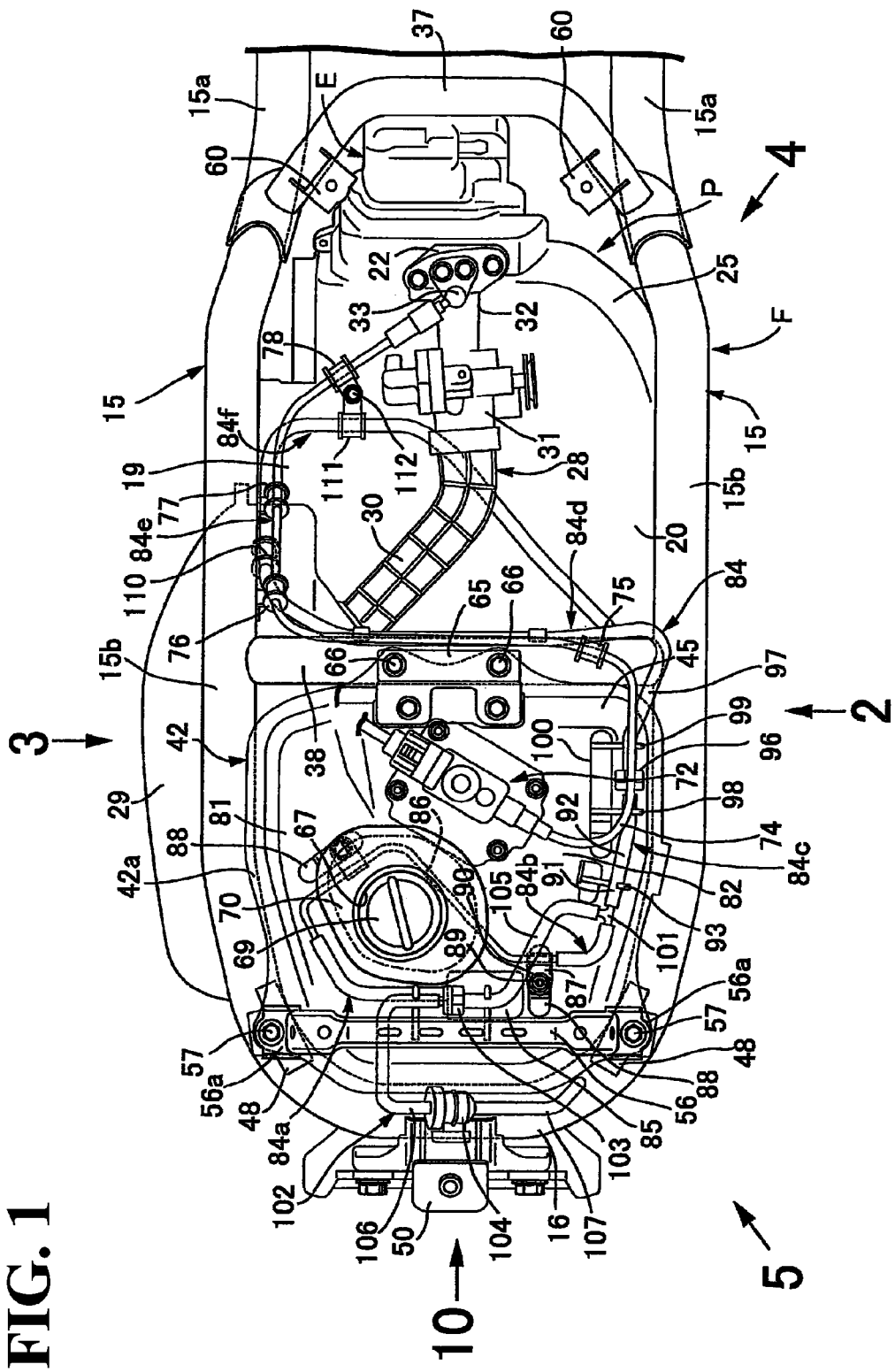
FIG. 1 A plan view showing a rear part of a vehicle body frame, a fuel tank and an engine.
Figure 2:
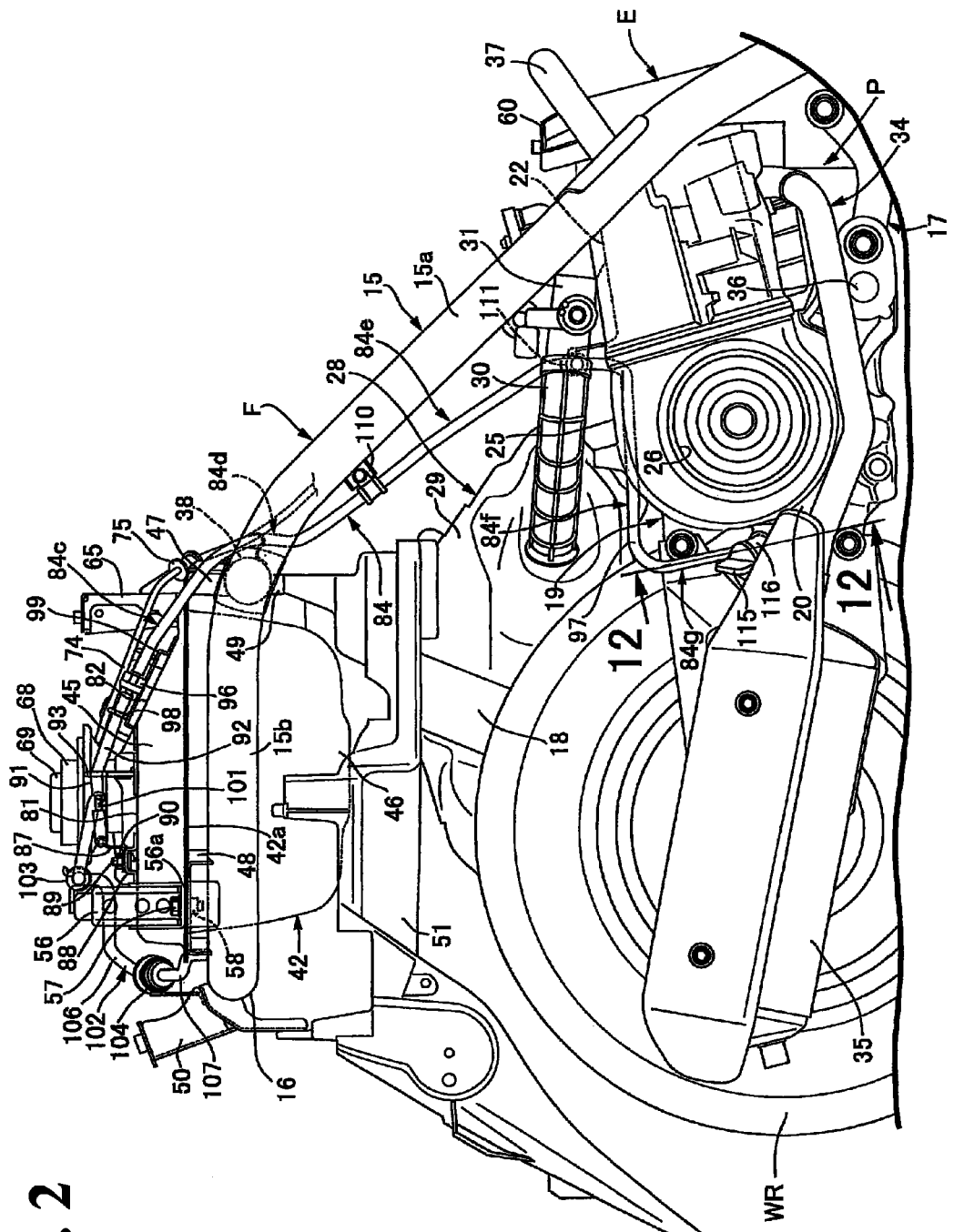
FIG. 2 A view as viewed in the direction indicated by an arrow 2 in FIG. 1.
Figure 3:
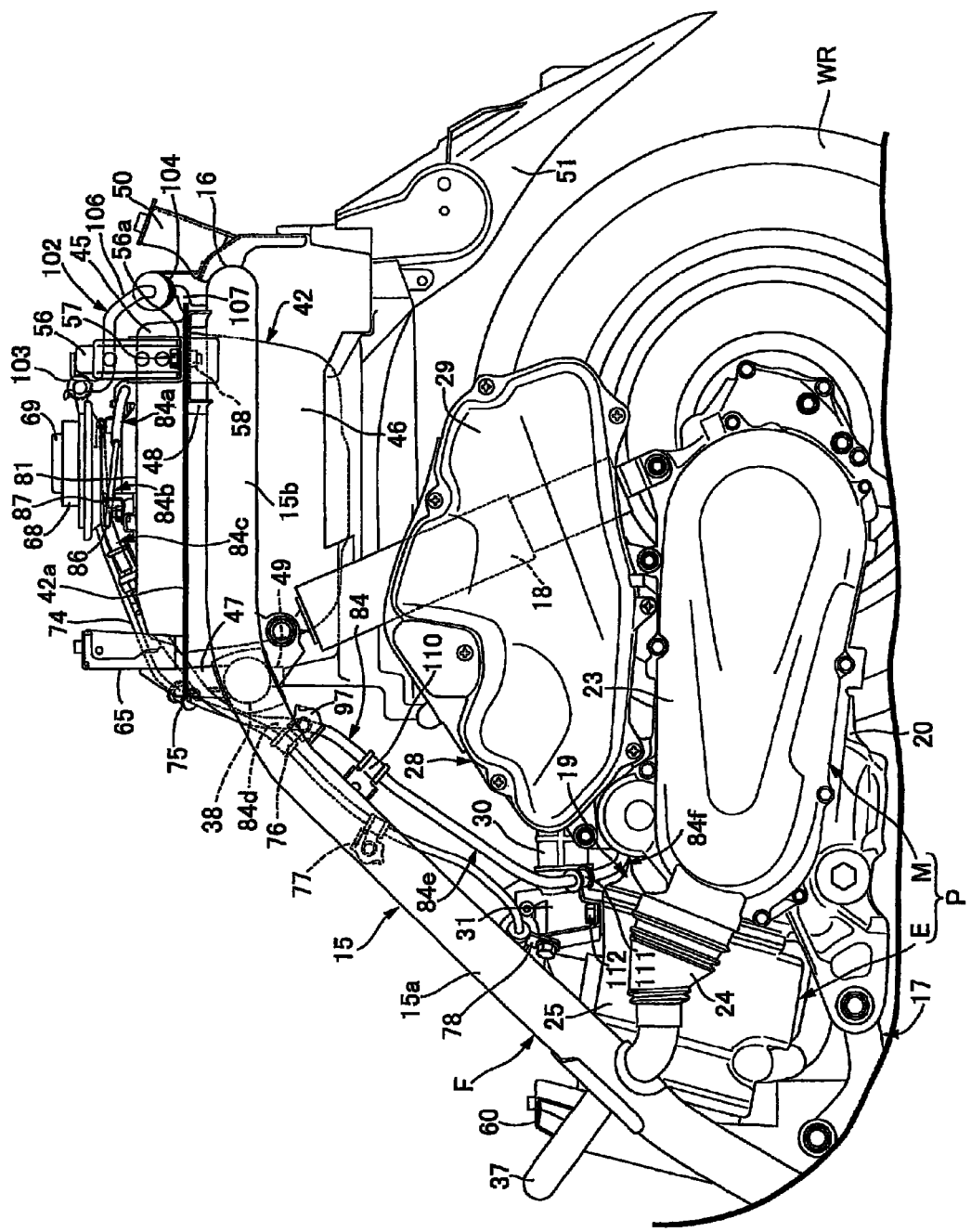
FIG. 3 A view as viewed in the direction indicated by an arrow 3 in FIG. 1.
Figure 4:
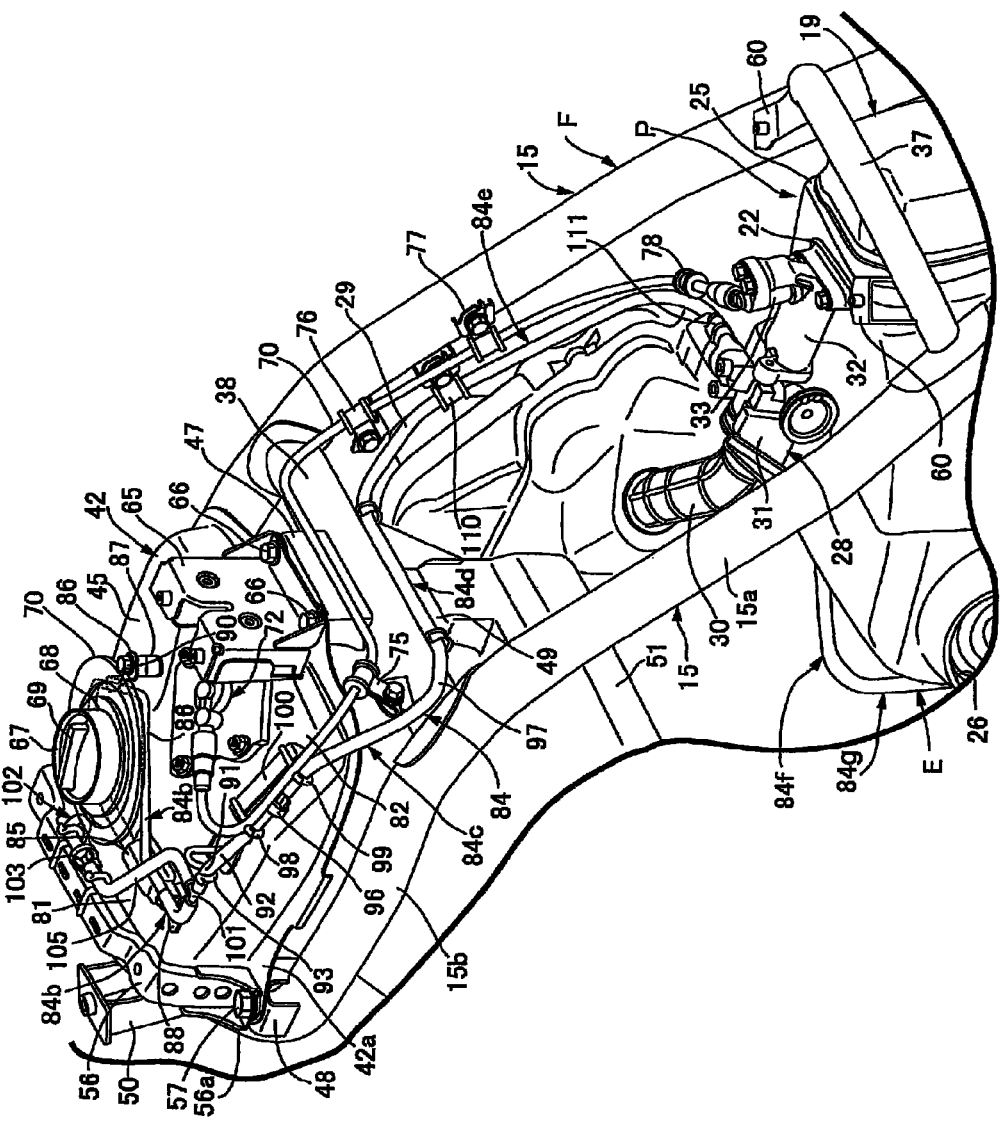
FIG. 4 A perspective view as viewed in the direction indicated by an arrow 4 in FIG. 1.
Figure 5:
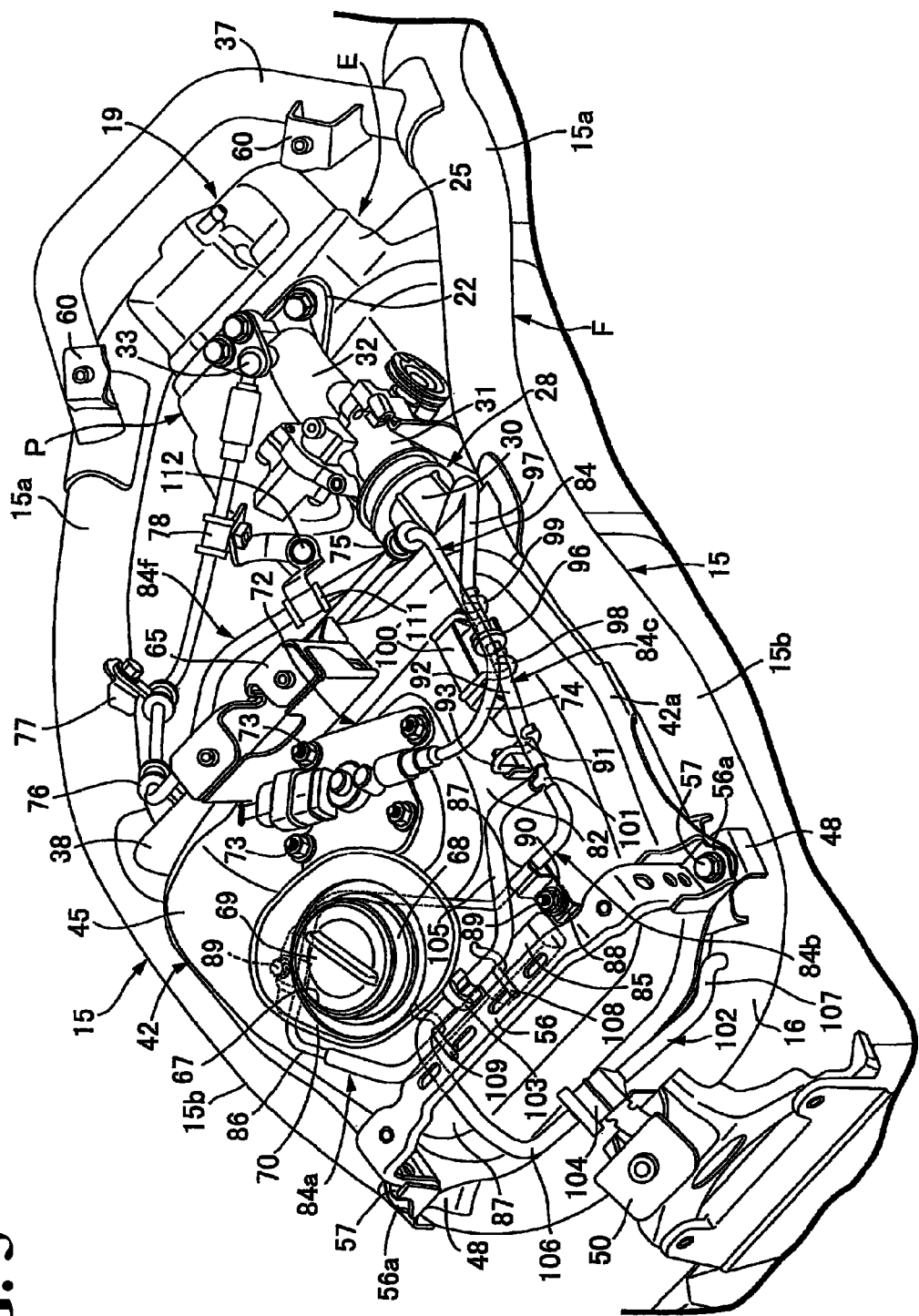
FIG. 5 A perspective view as viewed in the direction indicated by an arrow 5 in FIG. 1.

An embodiment of the present disclosure is explained in conjunction with FIG. 1 to FIG. 12. In the explanation of the embodiment made hereinafter, directions such as "frontward direction" and "rearward direction", and "leftward direction" and "rightward direction" follow the directions as viewed from a rider who rides on a motorcycle. Further, in the explanation made hereinafter, " . . . " is used for omitting the repetition of the use of the same reference symbol.

Firstly, in FIG. 1 to FIG. 5, a pair of left and right seat frames 15, 15 which constitute a part of a vehicle body frame F of a scooter-type motorcycle are formed of a pipe. The pair of left and right seat frames 15, 15 include inclined parts 15a . . . which are inclined rearwardly and upwardly and horizontal parts 15b . . . which extend rearwardly from upper ends of the inclined parts 15a . . . respectively, and rear ends of both horizontal parts 15b . . . are integrally connected to each other by a connection part 16.

A front part of a power unit P is supported on the vehicle body frame F in a vertically swingable manner by way of a link mechanism 17 below both seat frames 15 . . . , and a rear wheel WR which is arranged on a rear right side of the power unit P is pivotally supported on a rear part of the power unit P. Further, the power unit P is constituted of a forced air-cooled single cylinder 4-cycle engine E which generates power for driving the rear wheel WR and a continuously variable transmission M which is arranged between the engine E and the rear wheel WR, and a rear cushion unit 18 is arranged between a connection part between the inclined part 15a and the horizontal part 15b of the left seat frame 15 out of the both seat frames 15 . . . and a rear part of the power unit P.

An engine body 19 of the engine E includes a crankcase 20 and a cylinder head 22 which is arranged in front of the crankcase 20. The continuously variable transmission M is housed in the inside of a transmission case 23 which extends rearwardly from the engine body 19 while using a part of the crankcase 20 as a constitutional element thereof, and the rear wheel WR is pivotally supported on a rear part of the transmission case 23.

A fan (not shown in the drawing) which is rotated in response to an operation of the engine E is housed in the transmission case 23. One end portion of an intake duct 24 having a bellows shape is connected to a front part of the transmission case 23 for introducing cooling air into the inside of the transmission case 23 using the fan, and the other end portion of the intake duct 24 is connected to a lower part of the inclined part 15a of the left seat frame 15. That is, air from the inside of the left seat frame 15 is introduced into the inside of the transmission case 23 as cooling air.

Most of the engine body 19 is covered with a shroud 25. The fan (not shown in the drawing) which sucks cooling air into the inside of the shroud 25 from an intake port 26 formed in a right side wall of the shroud 25 is housed in the shroud 25 in a state where the fan is driven by the engine E.

An intake device 28 is connected to an upper side surface of the cylinder head 22 of the engine body 19. The intake device 28 includes an air cleaner 29 which is arranged on a left side of the rear wheel WR, a connecting tube 30 which has an upstream end thereof connected to the air cleaner 29, a throttle body 31 which is connected to a downstream end of the connecting tube 30, and an intake pipe 32 which connects the throttle body 31 and the cylinder head 22. A fuel injection valve 33 is mounted on the intake pipe 32.

Further, an exhaust device 34 is connected to a lower side surface of the cylinder head 22, and the exhaust device 34 includes an exhaust muffler 35 which is arranged on a right side of the rear wheel WR, and an exhaust pipe 36 which connects the exhaust muffler 35 and the cylinder head 22 to each other.

A first cross member 37 is provided between intermediate portions of the inclined parts 15a . . . of the both seat frames 15 . . . which constitute the part of the vehicle body frame F in a state where the first cross member 37 straddles a front part of the engine body 19, and a second cross member 38 is provided between connection parts between the inclined parts 15a . . . and the horizontal parts 15b . . . of the both seat frames 15 . . . .

Figure 6:
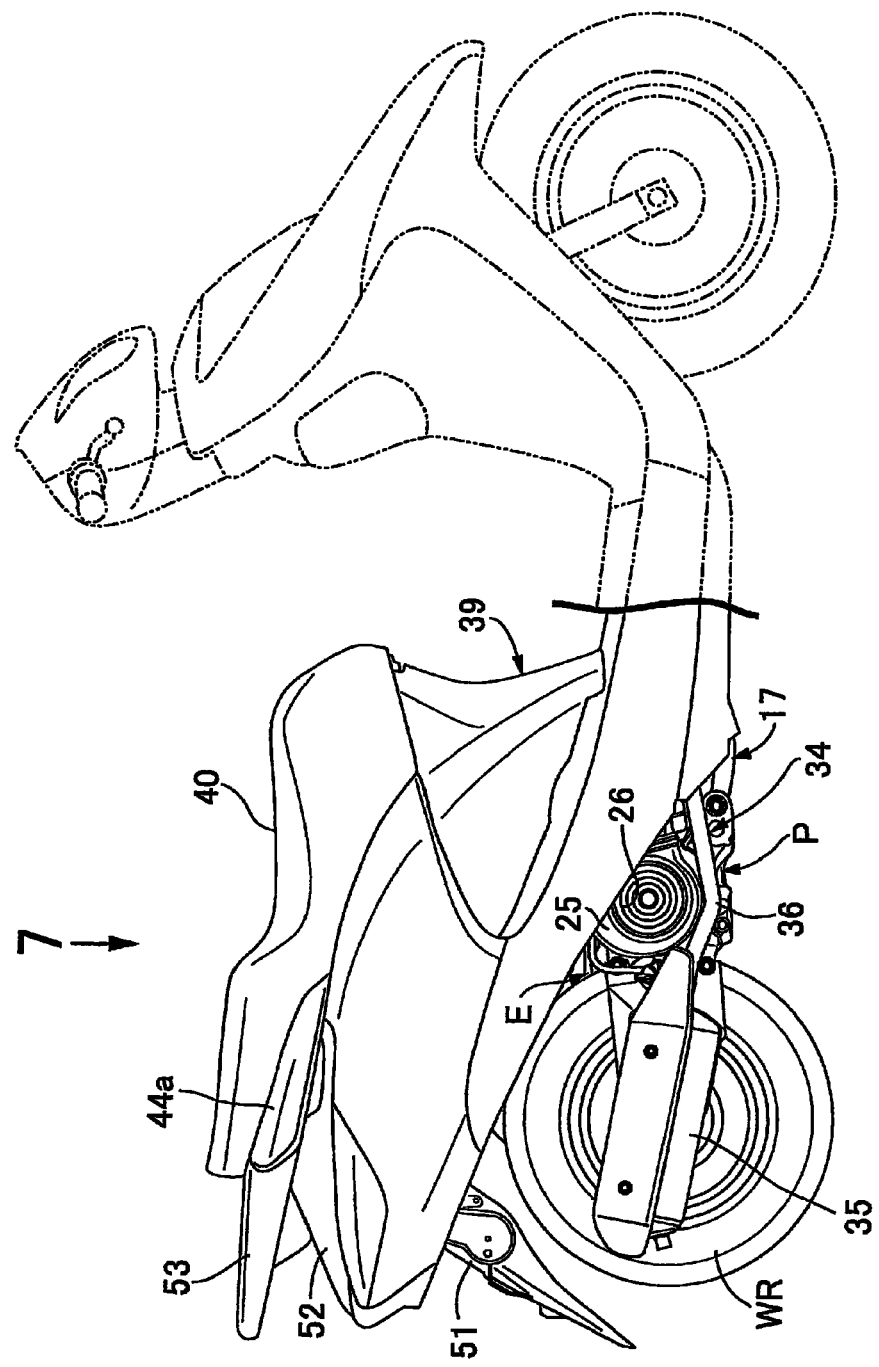
FIG. 6 A side view of a motorcycle.

As shown in FIG. 6, the vehicle body frame F is covered with a vehicle body cover 39 made of a synthetic resin, and a tandem-type rider's seat 40 is arranged above a rear part of the vehicle body cover 39.

A fuel tank 42 which is arranged below the rider's seat 40 is supported on a rear part of the vehicle body frame F in a state where the fuel tank 42 is arranged between the second cross member 38 which is provided between both seat frames 15 . . . and the connection part 16 which integrally connects the rear parts of both seat frames 15 . . . to each other. The fuel tank 42 is arranged above the power unit P.

Figure 7:
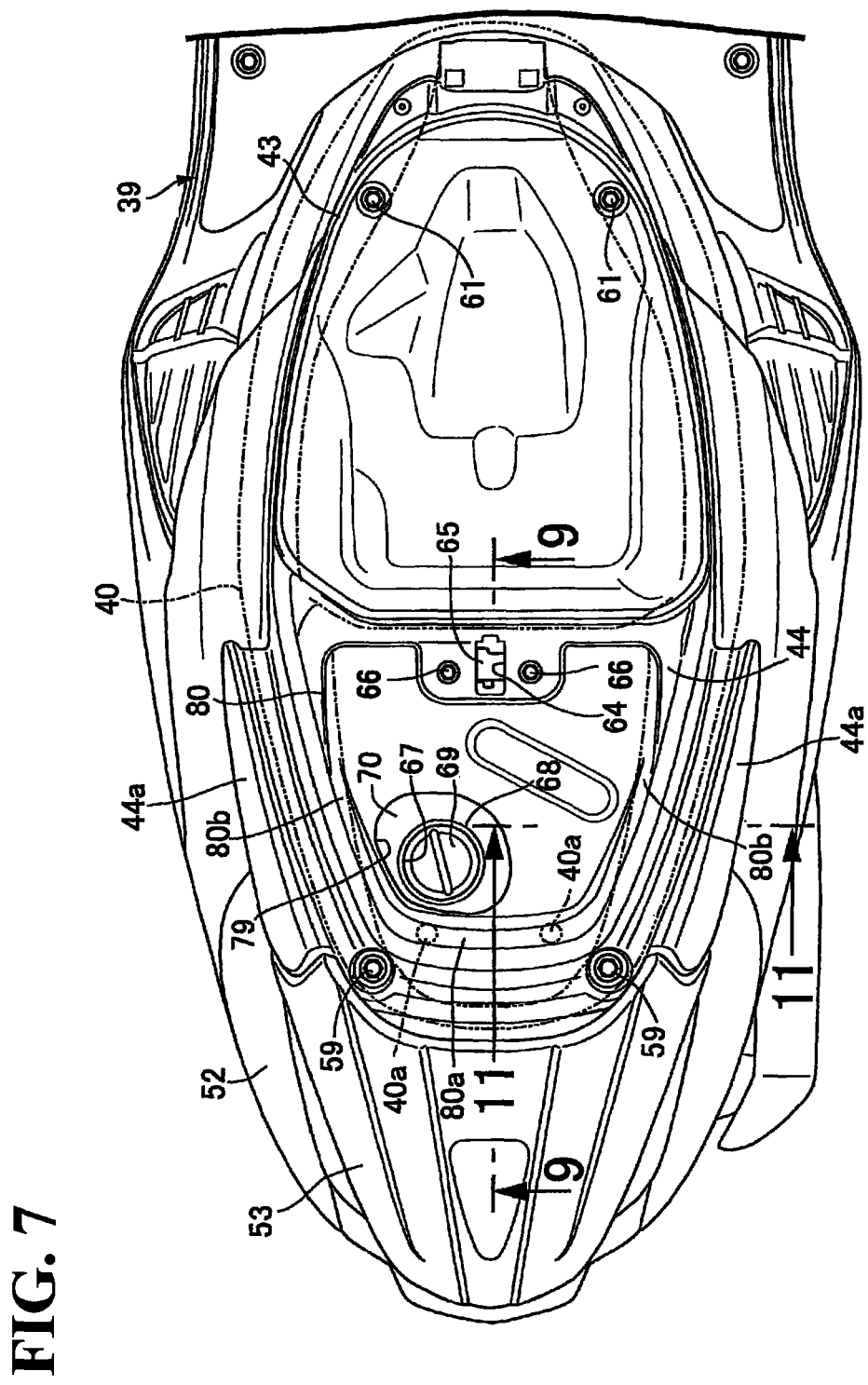
FIG. 7 A view showing the motorcycle in a state where a rider's seat is omitted as viewed in the direction indicated by an arrow 7 in FIG. 6.
Figure 8:
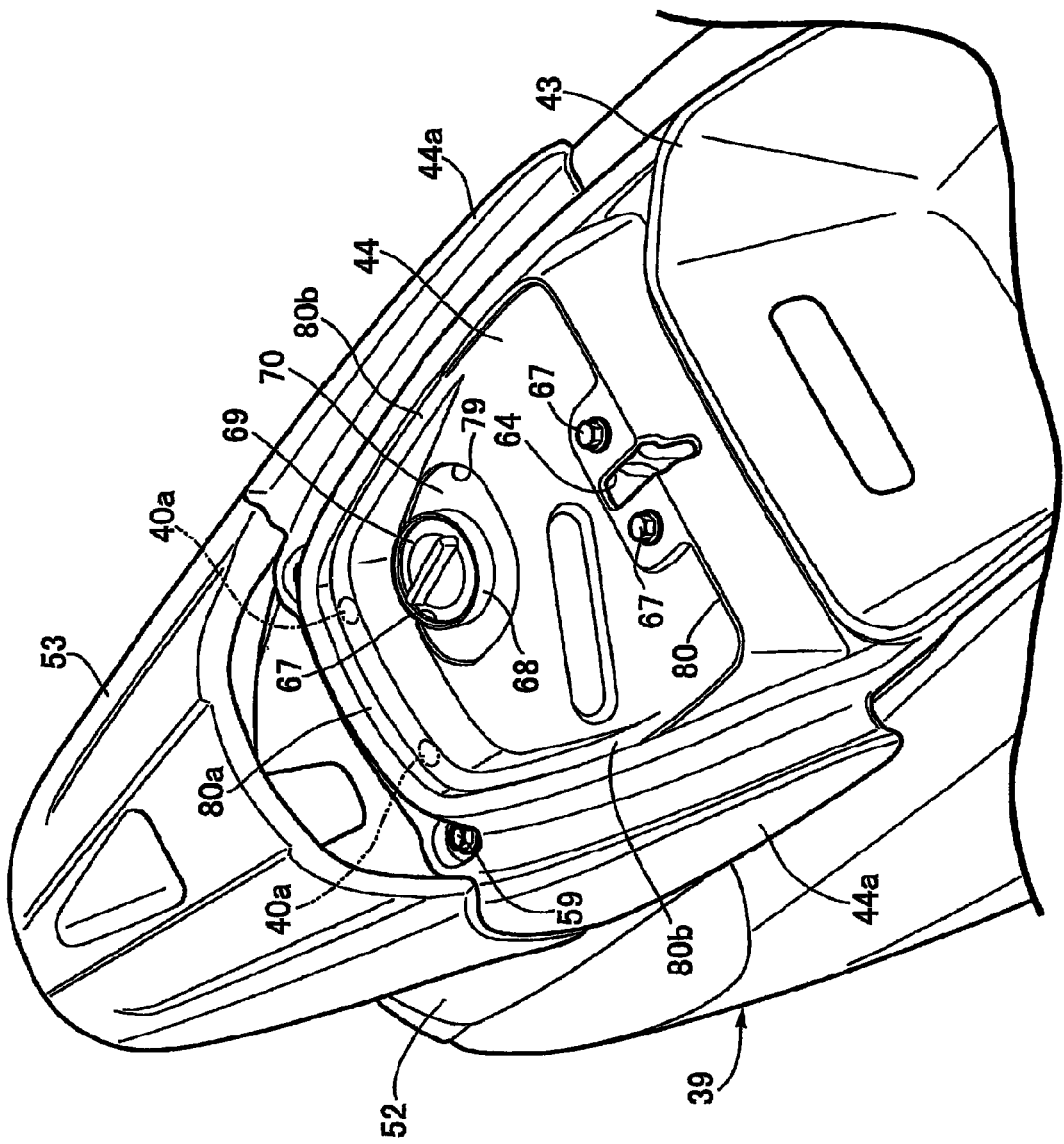
FIG. 8 A perspective view of a part shown in FIG. 7 as viewed from an oblique anterior angle.
Figure 9:
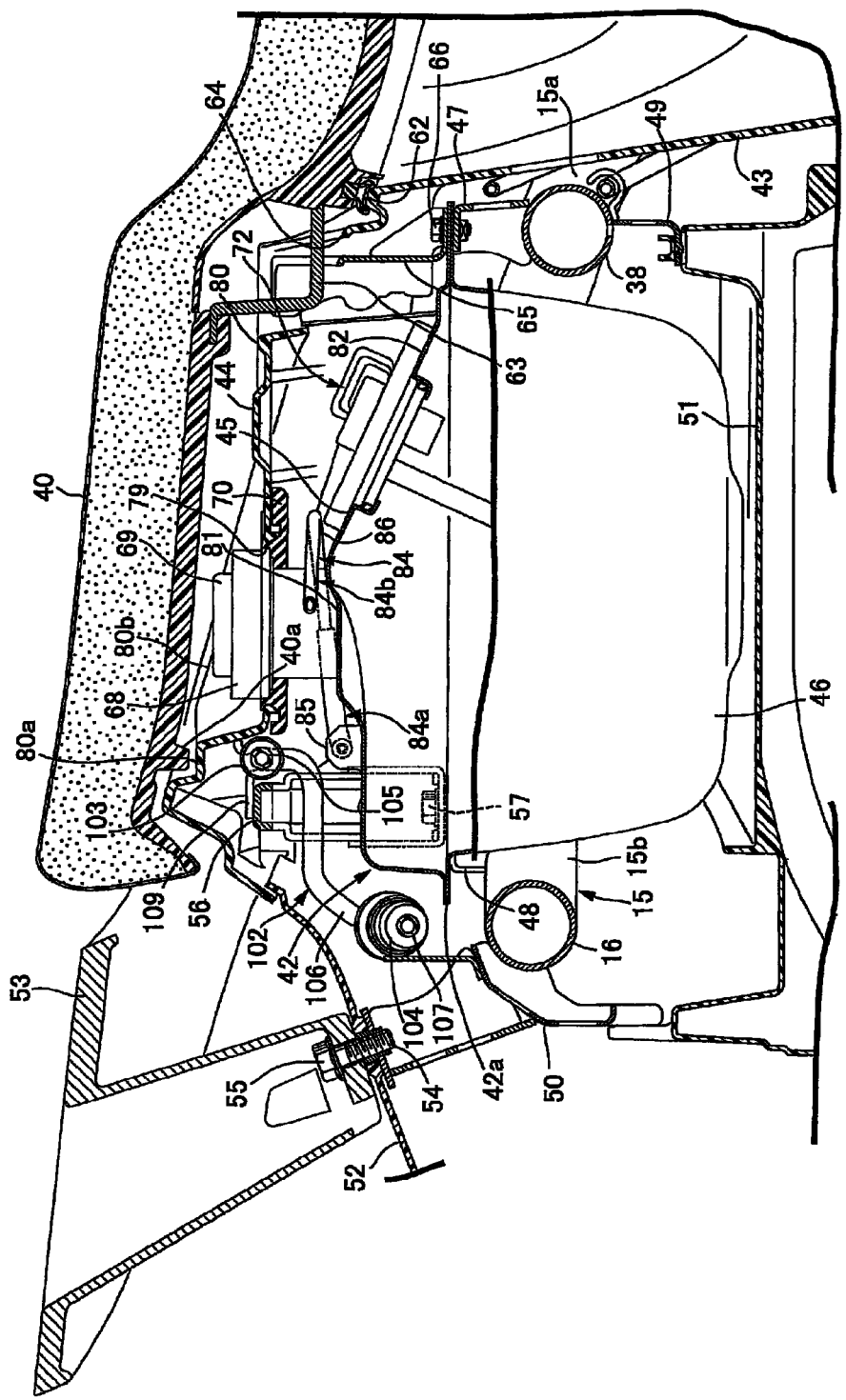
FIG. 9 A cross-sectional view taken along a line 9-9 in FIG. 7.

To explain the embodiment also in conjunction with FIG. 7 to FIG. 9, the fuel tank 42 is covered with a tank cover 44 from above, and the tank cover 44 is integrally connected to a rear upper edge of a synthetic-resin-made storage box 43 which is arranged in front of the fuel tank 42 between the both seat frames 15 . . . . The tank cover 44 extends rearwardly from the storage box 43 in a state where the tank cover 44 passes through a space formed between the rider's seat 40 and the fuel tank 42. Further, the storage box 43 is formed with an opened upper end, and this upper-end opening portion of the storage box 43 is closed by a front part of the rider's seat 40.

To focus on FIG. 9, the fuel tank 42 is formed by joining an upper tank half body 45 which has a box shape and opens downwardly and a lower tank half body 46 which has a box shape and opens upwardly to each other, and a flange part 42a which projects outwardly is formed on a joint portion of the upper tank half body 45 and the lower tank half body 46.

A first stay 47 is fixedly mounted on a center portion of the second cross member 38 in the vehicle widthwise direction in an upwardly projecting manner, and a front portion of the flange part 42a of the fuel tank 42 is fastened to and is supported on the first stay 47. Further, second stays 48 . . . which project upwardly are fixedly mounted on rear portions of the horizontal parts 15b . . . of the both seat frames 15 . . . respectively, and both left and right rear portions of the flange part 42a of the fuel tank 42 are fastened to and are supported on the second stays 48 . . . .

A third stay 49 which projects downwardly is fixedly mounted on the second cross member 38 at a portion where the first stay 47 is fixedly mounted, a fourth stay 50 which projects vertically is fixedly mounted on the connection part 16 which integrally connects the rear parts of the both seat frames 15 . . . to each other, and a fender 51 which is arranged between the fuel tank 42 and the rear wheel WR so as to cover the rear wheel WR from above is supported on a lower part of the third stay 49 and a lower part of the fourth stay 50.

A rear cover 52 which constitutes a part of the vehicle body cover 39 and is contiguously arranged with a rear part of the tank cover 44 and a carrier 53 which is arranged behind the rider's seat 40 are supported on an upper portion of the fourth stay 50 by fastening the rear cover 52 and the carrier 53 together by threadedly engaging bolts 55 with nuts 54 fixedly mounted on the upper portion of the fourth stay 50.

Here, projecting parts 44a . . . which project more outwardly than the rider's seat 40 are integrally formed with both sides of the tank cover 44, and both side portions of the carrier 53 are formed such that the side portions of the carrier 53 are smoothly and contiguously arranged with the projecting parts 44a . . . . Both projecting parts 44a . . . and both side portions of the carrier 53 function as a grab rail which a pillion who is seated on a rear part of the rider's seat 40 can grasp.

Figure 10:
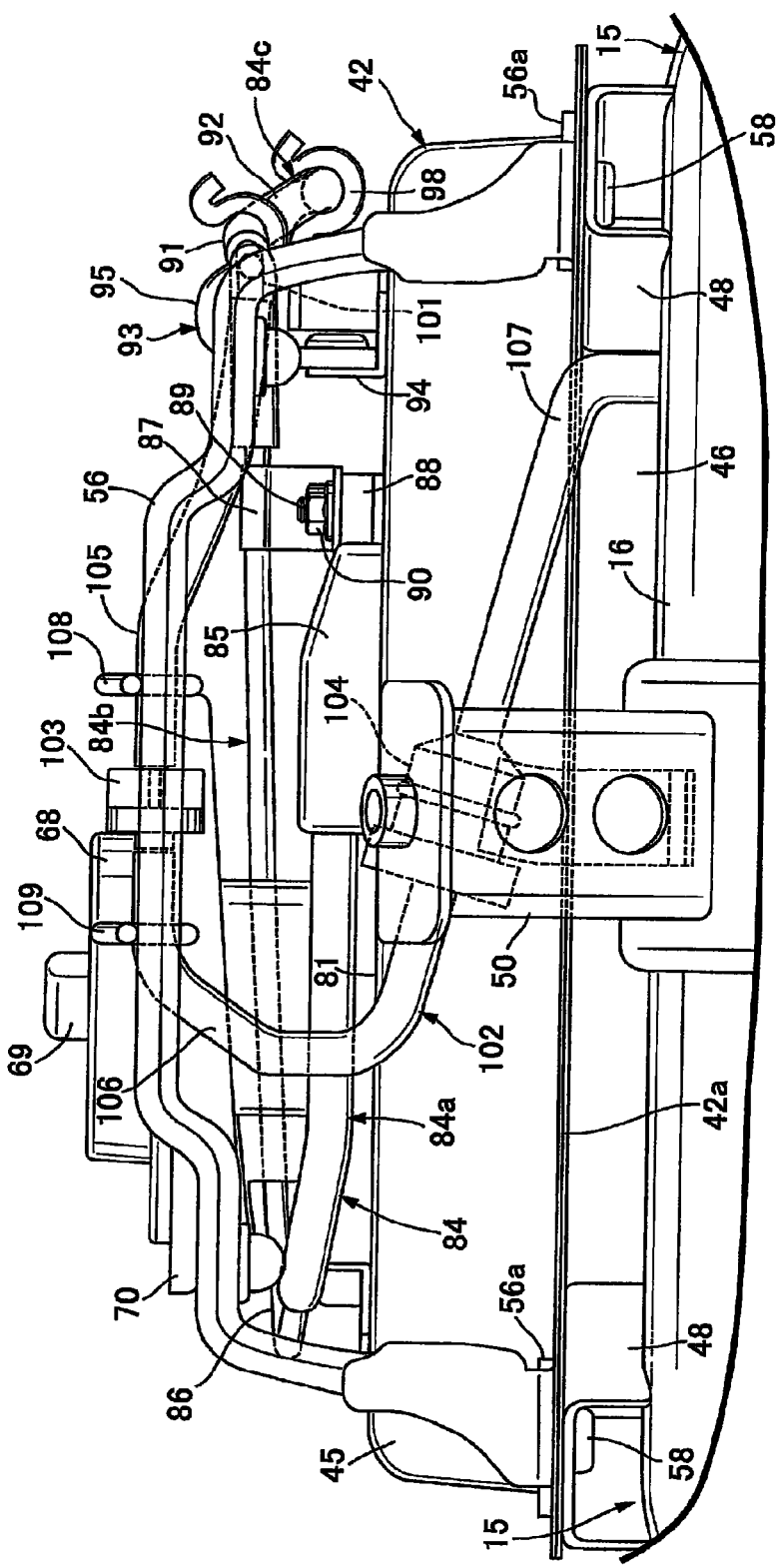
FIG. 10 A view as viewed in the direction indicated by an arrow 10 in FIG. 1.

To explain the embodiment also in conjunction with FIG. 10, the rear part of the tank cover 44 which covers the fuel tank 42 from above is supported on a fifth stay 56 which is formed into an approximately downwardly-opened U shape so as to straddle the rear part of the fuel tank 42. Fastening plate portions 56a . . . which sandwich both left and right rear portions of the flange part 42a of the fuel tank 42 between the second stays 48 . . . and the fastening plate portions 56a . . . respectively are mounted on both left and right end portions of the fifth stay 56. Bolts 57 penetrate the fastening plate portions 56a . . . and the flange part 42a . . . are threadedly engaged with welded nuts 58 which are fixedly mounted on lower surfaces of the second stays 48 . . . and hence, the fastening plate portions 56a . . . of the both left and right end portions of the fifth stay 56 and the both left and right rear portions of the flange part 42a of the fuel tank 42 are fastened together to the second stays 48 . . . respectively. Further, both sides of the rear part of the tank cover 44 are fastened to the fifth stay 56 by bolts 59, 59.

Box receiving members 60, 60 are mounted on both sides of the first cross member 37, and both sides of a front part of the storage box 43 are fastened to both box receiving members 60 . . . by bolts 61, 61 in a state where a resilient member (not shown in the drawing) is interposed between both sides of the front part of the storage box 43 and the box receiving members 60 . . . .

Here, the rider's seat 40 is rotatably and pivotally supported on an upper portion of a front end of the storage box 43 in a state where the rider's seat 40 is rotatable between a closed state where the rider's seat 40 covers the storage box 43 and the tank cover 44 from above and an open state where the storage box 43 and the tank cover 44 are exposed. A seal member 62 (see FIG. 9) which is resiliently brought into contact with an upper end of the storage box 43 in the closed state is mounted on a lower surface of the rider's seat 40.

Further, an engaging member 63 is mounted on a lower part of the rider's seat 40 at a position corresponding to a front part of the tank cover 44, and a seat locking opening part 64 into which the engaging member 63 is inserted in a state where the rider's seat 40 is closed is mounted on a connection part where the storage box 43 and the tank cover 44 are connected to each other.

Further, a seat locking stay 65 which is brought into contact with the front part of the tank cover 44 from below is arranged at a position corresponding to the seat locking opening portion 64 such that the front portion of the flange part 42a of the fuel tank 42 is sandwiched between the seat locking stay 65 and the first stay 47 and hence, the front portion of the flange part 42a and the seat locking stay 65 are fastened together to the first stay 47 by a pair of bolts 66, 66. Further, the front part of the tank cover 44 is fastened to the seat locking stay 65 by bolts 66, 66 which are arranged on both left and right sides of the seat locking opening portion 64.

A seat locking mechanism not shown in the drawing is provided to the seat locking stay 65, and the seat locking mechanism can change over a locked state where the seat locking mechanism is engaged with the engaging member 63 which is inserted into the seat locking opening portion 64 in a state where the rider's seat 40 is closed thus holding the closed state of the rider's seat 40 and an unlocked state which allows a manipulation to open the rider's seat 40 by releasing the engagement between the seat locking mechanism and the engaging member 63.

A fuel filling port 67 is formed in an upper surface of the rear part of the fuel tank 42 on one side in the vehicle widthwise direction, that is, a left side in the vehicle widthwise direction in this embodiment. The fuel filling port 67 is formed of a fuel filling sleeve 68 which is fixedly mounted on the upper tank half body 45 of the fuel tank 42 in an upwardly projecting manner from the upper surface of the fuel tank 42, and the fuel filling port 67 is closed by a cap 69 in an openable/closeable manner. Further, a tray 70 which receives fuel spilt from the fuel filling port 67 is arranged around the fuel filling port 67, and the tray 70 is fixed to the fuel filling sleeve 68.

An upper end portion of a pump module 72 for discharging fuel in the fuel tank 42 is fastened to a center portion of the upper surface of the front part of the fuel tank 42 in the vehicle widthwise direction by a plurality of bolts 73, 73 . . . . A fuel supply tube 74 which is communicably connected to the pump module 72 has a portion which extends frontwardly from the pump module 72 above the fuel tank 42 on a right side in the vehicle widthwise direction, a portion which extends along the second cross member 38 from a right side to a left side in the vehicle widthwise direction, and a portion which extends toward the fuel injection valve 33 from the second cross member 38 on a left side in the vehicle widthwise direction partially along the inclined part 15a of the left seat frame 15, and the fuel supply tube 74 having such portions is connected to the fuel injection valve 33. To support the fuel supply tube 74, an fuel supply tube support member 75 is mounted on the second cross member 38, fuel supply tube support members 76, 77 are mounted on the inclined part 15a of the left seat frame 15, and an fuel supply tube support member 78 is mounted on an upper surface of the shroud 25 in the vicinity of the fuel injection valve 33.

An opening portion 79 which allows the fuel filling port 67 formed in the upper surface of the fuel tank 42 to face upwardly is formed in the tank cover 44, and the tray 70 is resiliently brought into contact with a lower surface of the tank cover 44 so as to close the opening portion 79.

A bulging part 80 which dams up the fuel overflown to the outside of the opening portion 79 at the time of supplying fuel to the fuel filling port 67 from above is formed on the tank cover 44 in an upwardly bulging manner in a state where the bulging part 80 is endlessly continued so as to surround the opening portion 79. Particularly, a rear portion 80a of the bulging part 80 largely bulges more upwardly than a front portion of the bulging part 80, and both left and right side portions 80b, 80b are formed such that an upwardly bulging amount is gradually increased as the both left and right side portions 80b, 80b extend from a front side to a rear side. Further, a pair of projections 40a . . . which are formed on a rear lower part of the rider's seat 40 are brought into contact with an upper portion of the rear part 80a of the bulging part 80 when an occupant is seated on the rider's seat 40 so that the rear part 80a of the bulging part 80 receives a weight of the rider's seat 40.

The upper surface of the above-mentioned fuel tank 42 includes a higher part 81 where the fuel filling port 67 is formed and a lower part 82 which is lower than the higher part 81, and the pump module 72 is arranged on the lower part 82. The lower part 82 is arranged on a front part of the upper surface of the fuel tank 42 in an offset manner toward a right side in the vehicle widthwise direction, and is formed in a downwardly inclined manner toward the crankcase 20 of the engine body 19.

A fuel gas evaporated in the fuel tank 42 is absorbed in oil in the crankcase 20 which constitutes a fuel absorption means, wherein the crankcase 20 is arranged below the upper surface of the fuel tank 42 such that the fuel gas is absorbed outside the fuel tank 42. The fuel gas generated in the fuel tank 42 is introduced into the crankcase 20 through a charge pipe passage 84.

The charge pipe passage 84 includes a first tank-side pipe passage part 84a which is connected to the upper surface of the fuel tank 42, and a second tank-side pipe passage part 84b which is communicably connected with the first tank-side pipe passage part 84a and extends toward the other side of the fuel tank 42 from one side of the fuel tank 42 in the vehicle widthwise direction on an end portion thereof on a fuel tank 42 side. The first tank-side pipe passage part 84a extends toward the one side of the fuel tank 42 in the vehicle widthwise direction from a connection part 85 connected to the upper surface of the fuel tank 42, and is communicably connected to the second tank-side pipe passage part 84b. In this embodiment, the connection part 85 connected to the upper surface of the fuel tank 42 is arranged behind the fuel filling port 67 and on a center portion of the higher part 81 of the upper surface of the fuel tank 42 in the vehicle widthwise direction in an offset manner from the fuel filling port 67 formed in the upper surface of the fuel tank 42 on a left side in the vehicle widthwise direction. The first tank-side pipe passage part 84a is arranged such that the first tank-side pipe passage part 84a extends leftwardly in the vehicle widthwise direction from the connection part 85, and the second tank-side pipe passage part 84b which is connected to the first tank-side pipe passage part 84a is arranged such that the second tank-side pipe passage part 84b extends toward a right side from the left side in the vehicle widthwise direction.

The first tank-side pipe passage part 84a and the second tank-side pipe passage part 84b are connected to each other such that the first tank-side pipe passage part 84a and the second tank-side pipe passage part 84b surround the periphery of the fuel filling port 67, a part of the first tank-side pipe passage part 84a and a part of the second tank-side pipe passage part 84b are arranged so as to pass below the tray 70 which receives fuel spilled from the fuel filling port 67. A Part which constitutes the portion of the first tank-side pipe passage part 84a and the portion of the second tank-side pipe passage part 84b and passes below the tray 70 is formed of a metallic pipe 86 which is bent so as to surround a part of the fuel filling sleeve 68. For example, two portions of the metallic pipe 86 are held by pipe holding members 87, 87. Mounting members 88, 88 are welded to the higher part 81 of the upper surface of the fuel tank 42 corresponding to the pipe holding members 87 . . . , and the pipe holding members 87 . . . are mounted on the mounting members 88 . . . by bolts 89 . . . and nuts 90 . . . . Painting treatment is applied to the fuel tank 42 including the mounting members 88 . . . , and the metallic pipe 86 is fastened to the fuel tank 42 to which the painting treatment is applied.

Further, the charge pipe passage 84 includes a third tank-side pipe passage part 84c which is connected to the second tank-side pipe passage part 84b on the other side in the vehicle widthwise direction (right side in this embodiment), and has a highest part 91 arranged at a highest position of the charge pipe passage 84 at an intermediated position thereof. The third tank-side pipe passage part 84c is arranged to extend frontwardly above the lower part 82 of the upper surface of the fuel tank 42.

A part of the third tank-side pipe passage part 84c which includes at least the highest part 91 is formed of an elastic tube 92, and the highest part 91 of the elastic tube 92 is supported on a highest part support part 93 mounted on the fuel tank 42 from below.

Figure 11:
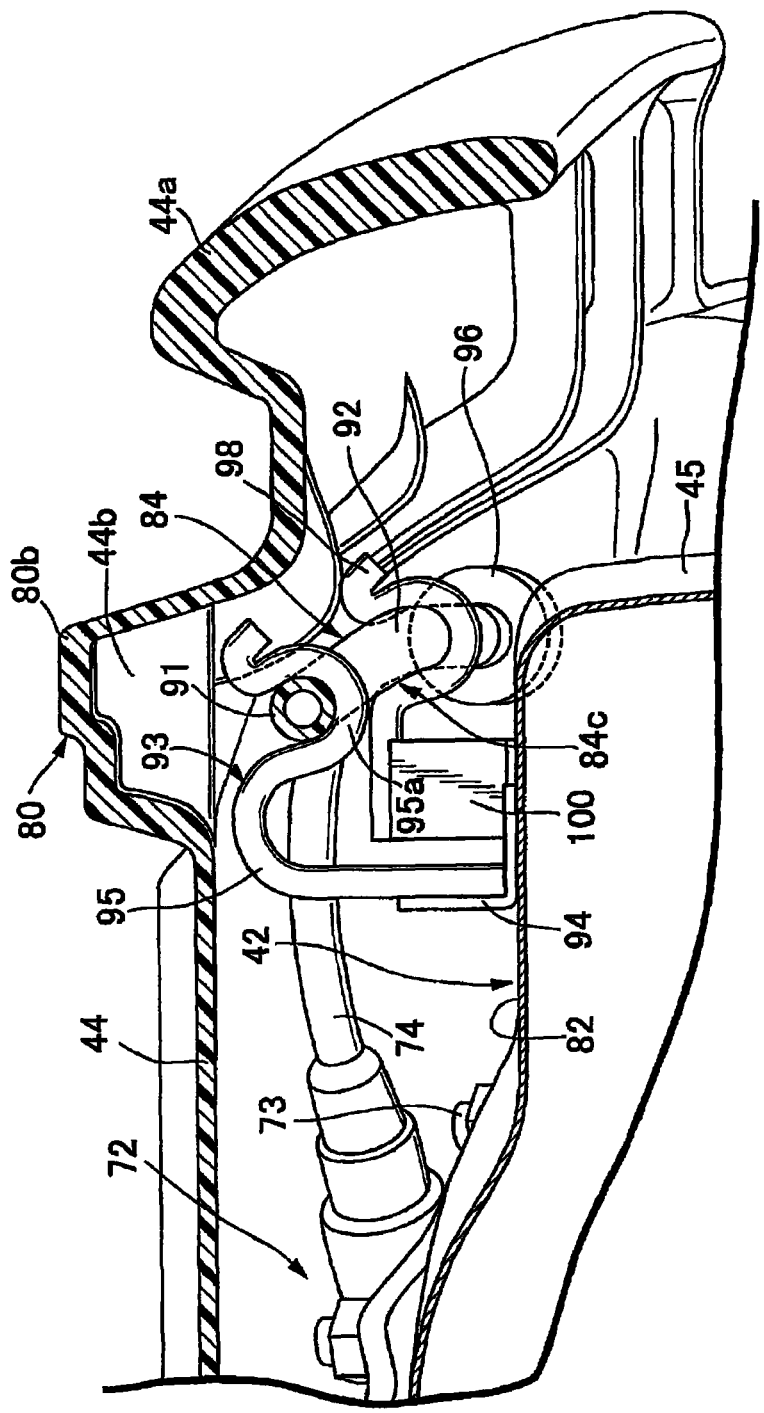
FIG. 11 An enlarged cross-sectional view taken along a line 11-11 in FIG. 7.

To focus on FIG. 11, the highest part support part 93 is constituted of a support plate 94 which is fixedly mounted on the upper surface of the fuel tank 42 and an upper open clamper 95 which is fixedly mounted on the support plate 94, and the highest part 91 of the elastic tube 92 is supported on an approximately U-shaped holding part 95a which is formed on a part of the upper open clamper 95 formed of a round rod and opens upwardly from below.

The highest part support part 93 is arranged below the right side part 80b of the bulging part 80 which is formed on the tank cover 44 so that a relatively large empty space is formed above the highest part support part 93. In view of the above, a rib 44b which prevents the elastic tube 92 from being upwardly removed from the upper open clamper 95 is integrally formed on the tank cover 44 such that the rib 44b traverses the inside of the right side part 80b. It is desirable that the rib 44b is arranged just above the upper open clamper 95. Although the rib 44b is arranged just above the upper open clamper 95, the rib 44b may be arranged in a slightly offset manner in the longitudinal direction of the elastic tube 92 from just above the upper open clamper 95 provided that the upward removal of the elastic tube 92 from the upper open clamper 95 can be prevented at such a position.

Further, as clearly shown in FIG. 10, a part of the charge pipe passage 84 ranging from the highest part 91 to the connection part 85 with the fuel tank 42 is arranged with a downward gradient toward the connection part 85.

A first check valve 96 which prevents a backflow of a fuel gas toward a fuel tank 42 side is interposed on a part of the third tank-side pipe passage part 84*c* of the charge pipe passage 84 downstream of the highest part 91 in a state where the first check valve 96 is supported on the fuel tank 42. The first check valve 96 is arranged above the lower part 82 of the upper surface of the fuel tank 42.

A part of the third tank-side pipe passage part 84*c* of the charge pipe passage 84 includes the elastic tube 92 which has a downstream end thereof connected to the first check valve 96 and is arranged above the fuel tank 42, and an elastic tube 97 which has an upstream end thereof connected to the first check valve 96 and is arranged above the fuel tank 42. The elastic tube 92 is held by an upper open clamper 98 downstream of a portion thereof held by the upper open clamper 95, and an upstream end portion of the elastic tube 97 is held by an upper open clamper 99.

The upper open clampers 98, 99 are fixedly mounted in common on a support plate 100 which is fixedly mounted on the upper surface of the fuel tank 42. The removal of the elastic tubes 92, 97 from the upper open clampers 95, 98, 99 mounted on the upper surface of the fuel tank 42 is prevented by the tank cover 44 which covers the fuel tank 42 from above.

A branch part 101 is formed on the third tank-side pipe passage part 84*c* of the charge pipe passage 84 at a position closer to the fuel tank 42 side than the first check valve 96. An atmospheric air introducing pipe passage 102 which introduces atmospheric air to the inside of the fuel tank 42 is connected to the branch part 101, and a second check valve 103 which prevents the flow of a fuel gas from the fuel tank 42 side is interposed on the atmospheric air introducing pipe passage 102. Further, as clearly shown in FIG. 10, the second check valve 103 is arranged at a position higher than the highest part 91 of the charge pipe passage 84.

The atmospheric air introducing pipe passage 102 opens in atmospheric air below the second check valve 103. In this embodiment, the atmospheric air introducing pipe passage 102 is connected to the connection part 16 in such a manner that the atmospheric air introducing pipe passage 102 opens in atmospheric air in the pipe-shaped connection part 16 which connects rear parts of the pair of left and right seat frames 15 . . . to each other.

Further, a filter 104 is interposed on the atmospheric air introducing pipe passage 102 at a position closer to an atmospheric air open side, that is, a connection part 16 side than the second check valve 103. The filter 104 is interposed on a portion of the atmospheric air introducing pipe passage 102 which has a downward gradient toward the atmospheric air open side, that is, the connection part 16 side.

The atmospheric air introducing pipe passage 102 includes an elastic tube 105 which has one end portion thereof connected to the branch part 101 and the other end portion thereof connected to the second check valve 103, an elastic tube 106 which has one end portion thereof connected to the second check valve 103 and the other end thereof connected to the filter 104, and an elastic tube 107 which has one end portion thereof connected to the filter 104 and the other end portion thereof connected to the connection part 16 of the vehicle body frame F. The elastic tube 106 is arranged in an arcuately bent shape while connecting the second check valve 103 and the filter 104 arranged at an oblique rearward and downward position from the second check valve 103, and a part of the elastic tube 106 and the elastic tube 107 are arranged such that these parts have a downward gradient toward the connection part 16 while connecting the filter 104 therebetween.

The other end portion of the elastic tube 105 and one end portion of the elastic tube 106 are held by the upper open clampers 108, 109 at a position where the second check valve 103 is sandwiched between the elastic tube 105 and the elastic tube 106. These upper open clampers 108, 109 are fixedly mounted on the fifth stay 56 which constitutes a part of the vehicle body frame F so that the removal of the elastic tubes 105, 106 from these upper open clampers 108, 109 can be prevented by the tank cover 44 which covers the fuel tank 42 from above.

The second check valve 104 is arranged below the rear part 80*a* which receives a load from the rider's seat 40 out of the bulging part 80 formed on the tank cover 44 which covers the fuel tank 42 from above.

The charge pipe passage 84 includes: a communication pipe passage part 84*d* which is connected to the third tank-side pipe passage part 84*c* on the other side in the vehicle widthwise direction (a right side in this embodiment) and extends toward one side in the vehicle widthwise direction (a left side in this embodiment) along the second cross member 38; a first engine-side pipe passage part 84*e* which is connected to the communication pipe passage part 84*d* and is arranged above the engine body 19 in a vertically extending manner on the one side in the vehicle widthwise direction; a second engine-side pipe passage part 84*f* which is connected to a lower end of the first engine-side pipe passage part 84*e* on the one side in the vehicle widthwise direction and extends from the one side to the other side in the vehicle widthwise direction above the engine body 19; and a third engine-side pipe passage part 84*g* which is connected to the second engine-side pipe passage part 84*f* on the other side in the vehicle widthwise direction and is connected to the engine body 19.

In this embodiment, the communication pipe passage part 84*d* is connected to the third tank-side pipe passage part 84*c* on the right side in the vehicle widthwise direction and extends leftwardly in the vehicle widthwise direction along the second cross member 38. The communication pipe passage part 84*d* is connected to an upper end of the first engine-side pipe passage part 84*e* on the left side in the vehicle widthwise direction and extends rightwardly in the vehicle widthwise direction along the second cross member 38 and is connected to the fuel tank 42 through the third, the second and the first tank-side pipe passage parts 84*c*, 84*b*, 84*a*. The first engine-side pipe passage part 84*e* extends in the vertical direction on the left side in the vehicle widthwise direction, the second engine-side pipe passage part 84*f* is arranged in an extending manner from the left side to the right side in the vehicle widthwise direction above the engine body 19, and the third engine-side pipe passage part 84*g* is connected to the crankcase 20 of the engine body 19 on the right side in the vehicle widthwise direction.

A frame-side support part 110 which supports an intermediate part of the first engine-side pipe passage part 84*e* is mounted on the vehicle body frame F, and on an upper surface of the shroud 25 of the engine E, an engine-side support part 111 which supports an intermediate part of the second engine-side pipe passage part 84*f* is mounted. The engine-side support part 111 is mounted on the upper surface of the shroud 25 together with the fuel supply tube support member 77 by bolts 112.

The engine-side support part 111 is arranged at a position closer to one side in the vehicle widthwise direction (left side in this embodiment) than the intake device 28 as viewed in a plan view, and the frame-side support part 110 is arranged at an oblique rearward and upward position from the engine-side support part 111, and is mounted on the inclined part 15*a* of the seat frame 15 on the one side in the vehicle widthwise direction (left side in this embodiment) out of the both seat frames 15 . . . .

Further, at least a part of the charge pipe passage 84 between the engine-side support part 111 and the frame-side support part 110 is formed of the elastic tube 97. In this embodiment, the elastic tube 97 which forms a part of the third tank-side pipe passage part 84c and has one end portion thereof connected to the first check valve 96 constitutes the whole communication pipe passage part 84d, the whole first engine-side pipe passage part 84e, the whole second engine-side pipe passage part 84f and a part of the third engine-side pipe passage part 84g.

Further, as shown in FIG. 1, the second engine-side pipe passage part 84f is arranged so as to pass below the connecting tube 30 and the throttle body 31 of the intake device 28.

Figure 12:
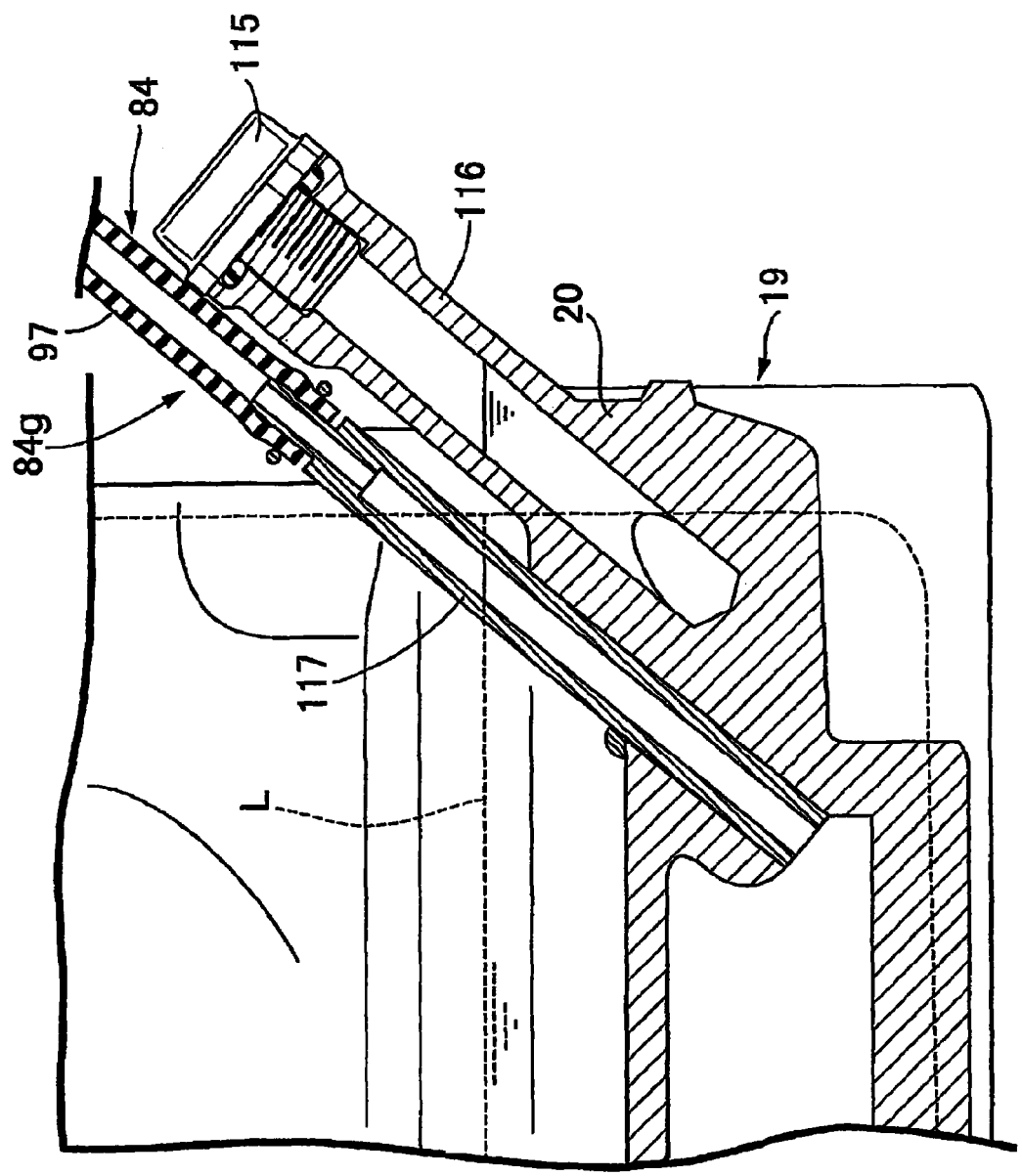
FIG. 12 A cross-sectional view taken along a line 12-12 in FIG. 2.

As shown in FIG. 12, the third engine-side pipe passage part 84g is connected to the crankcase 20 in such a manner that the third engine-side pipe passage part 84g is arranged adjacent to, inside in the vehicle widthwise direction, a fuel supply pipe 116 which is arranged on a right side part of the crankcase 20 for supplying oil to the inside of the crankcase 20 of the engine body 19, extends obliquely in the upward direction, and has an upper end portion thereof closed by a cap 115. The third engine-side pipe passage part 84g is constituted of a part of the elastic tube 97, and a metallic tubular body 117 which has an upper end portion thereof connected to the elastic tube 97 and is fixedly mounted on the crankcase 20. The other end of the tubular body 117 opens in the inside of the crankcase 20 below an oil surface L of oil in the crankcase 20. Accordingly, a fuel gas which is evaporated in the fuel tank 42 and is introduced through the charge pipe passage 84 is absorbed by oil in the crankcase 20.

Next, the manner of operation of this embodiment is explained. The charge pipe passage 84 which introduces a fuel gas evaporated in the fuel tank 42 toward the crankcase 20 which constitutes the fuel absorption means includes the first tank-side pipe passage part 84a which is connected to the upper surface of the fuel tank 42 and the second tank-side pipe passage part 84b which is communicably connected with the first tank-side pipe passage part 84a and extends toward the other side (right side in this embodiment) of the fuel tank 42 from one side (left side in this embodiment) of the fuel tank 42 in the vehicle widthwise direction on the end portion thereof on the fuel tank 42 side. The first tank-side pipe passage part 84a and the second tank-side pipe passage part 84b are fixed to the upper surface of the fuel tank 42. Accordingly, even when the first tank-side pipe passage part 84a is connected to the fuel tank 42 at either one of positions in the vehicle widthwise direction, it is possible to suppress an amount of fuel which flows out from the fuel tank 42 toward the crankcase 20 through the charge pipe passage 84 when the motorcycle falls. Further, at least the part of the charge pipe passage 84 can be mounted on the fuel tank 42 in advance and hence, the structure can contribute to the enhancement of assembling property.

The first tank-side pipe passage part 84a extends toward one side (left side in this embodiment) of the fuel tank 42 from the connection part 85 connected to the upper surface of the fuel tank 42 in the vehicle widthwise direction, and is connected to the second tank-side pipe passage part 84b. Accordingly, the flowout of fuel when the motorcycle falls can be effectively suppressed.

The fuel filling port 67 is formed in the upper surface of the fuel tank 42 on one side in the vehicle widthwise direction (left side in this embodiment), and the first tank-side pipe passage part 84a which is connected to the upper surface of the fuel tank 42 at a position offset from the fuel filling port 67 and the second tank-side pipe passage part 84b are connected to each other in a state where the first tank-side pipe passage part 84a and the second tank-side pipe passage part 84b surround the periphery of the fuel filling port 67. Accordingly, the part of the first tank-side pipe passage part 84a and the part of the second tank-side pipe passage part 84b can be arranged with large curvatures respectively by making use of a dead space around the fuel filling port 67 thus easing the arrangement of the first tank-side pipe passage part 84a and the second tank-side pipe passage part 84b.

The tray 70 which receives fuel spilt from the fuel filling port 67 is arranged around the fuel filling port 67, and the part of the first tank-side pipe passage part 84a and the part of the second tank-side pipe passage part 84b are arranged to pass below the tray 70. Accordingly, even when the part of the first tank-side pipe passage part 84a and the part of the second tank-side pipe passage part 84b are arranged so as to surround the fuel filling port 67, an area of the tray 70 can be increased.

The charge pipe passage 84 is connected to the second tank-side pipe passage part 84b on the other side in the vehicle widthwise direction (right side in this embodiment), and includes the third tank-side pipe passage part 84c which has the highest part 91 arranged at the highest position of the charge pipe passage 84 at the intermediated position thereof. Accordingly, the flowout of fuel when the motorcycle falls can be more effectively suppressed.

Further, the part of the third tank-side pipe passage part 84c which includes at least the highest part 91 is formed of the elastic tube 92, and the highest part 91 of the elastic tube 92 is supported on the highest part support part 93 mounted on the fuel tank 42 from below. Accordingly, the degree of freedom in design can be enhanced by determining the height of the highest part 91 based on the height of the highest part support part 93. Further, the part of the charge pipe passage 84 ranging from the highest part 91 to the connection part 85 with the fuel tank 42 is arranged with a downward gradient toward the connection part 85 side. Accordingly, fuel stored in the charge pipe passage 84 between the highest part 91 and the fuel tank 42 can be easily returned to the fuel tank 42 side.

The downstream end of the charge pipe passage 84 is connected to the crankcase 20 in a state where the downstream end of the charge pipe passage 84 opens in the oil in the crankcase 20, and the first check valve 96 which prevents a backflow of a fuel gas toward the fuel tank 42 is interposed on a portion of the charge pipe passage 84 downstream of the highest part 91. Accordingly, it is possible to effectively prevent oil in the crankcase 20 from flowing toward the fuel tank 42 by the first check valve 96, and it is also possible to enhance assembling property by supporting the first check valve 96 on the fuel tank 42.

The upper surface of the fuel tank 42 includes the higher part 81 in which the fuel filling port 67 is formed and the lower part 82 lower than the higher part 81, and the first check valve 96 is arranged on the lower part 82. Accordingly, it is possible to prevent the first check valve 96 from taking the high arrangement position. Further, the lower part 82 is formed in a downwardly inclined manner toward the crankcase 20. Accordingly, it is possible to make the flow of a fuel gas which passes through the first check valve 96 smooth.

The atmospheric air introducing pipe 102 which introduces an atmospheric air to the inside of the fuel tank 42 is connected to the branch part 101 which is formed on the third tank-side pipe passage part 84c of the charge pipe passage 84 at a position closer to the fuel tank 42 side than the first check valve 96, and the second check valve 103 which prevents the flow of fuel from the fuel tank 42 side is interposed on the atmospheric air introducing pipe 102. Accordingly, when the pressure inside the fuel tank 42 becomes a negative pressure, atmospheric air is introduced into the inside of the fuel tank 42 so as to adjust the pressure in the fuel tank 42 to an atmospheric pressure. Further, it is possible to prevent a fuel gas from being discharged to the outside through the atmospheric air introducing pipe 102 by the second check valve 103.

The parts of the elastic tubes 92, 97 which constitute at least a part of the charge pipe passage 84 and are arranged above the fuel tank 42 are held by the upper open clampers 95, 98, 99 which are mounted on the upper surface of the fuel tank 42, and the fuel tank 42 is covered with the tank cover 44 which prevents the removal of the elastic tubes 92, 97 from the upper open clampers 95, 98, 99. Accordingly, the part of the charge pipe passage 84 can be supported on the fuel tank 42 with the simple structure and hence, the assembling property can be enhanced.

Paint treatment is applied to the outer surface of the fuel tank 42, and the metallic pipe 86 which constitutes the part of the charge pipe passage 84 is fastened to the fuel tank 42. Accordingly, compared to a case where the metallic pipe 86 is fixed to the fuel tank 42 by welding, it is unnecessary to apply masking to the metallic pipe 86 and hence, a painting cost can be reduced.

The second check valve 103 is arranged at a position higher than the highest part 91 formed on the third tank-side pipe passage part 84c of the charge pipe passage 84 and hence, the second check valve 103 suppresses the inflow of fuel toward the second check valve 103 thus enhancing durability of the second check valve 103 by preventing the adhesion of fuel to the second check valve 103.

The branch part 101 is arranged on the third tank-side pipe passage part 84c at the position closer to the fuel tank 42 side than the highest part 91. Accordingly, when fuel flown out from the fuel tank 42 flows into the atmospheric air introducing pipe passage 102 at the connection part with the charge pipe passage 84, that is, between the branch part 101 and the second check valve 103 when a motorcycle falls, fuel in the atmospheric air introducing pipe passage 102 returns to a position upstream of the highest part 91 of the charge pipe passage 84 when the motorcycle is raised after falling and hence, the flow of fuel toward the engine body 19 can be prevented.

The atmospheric air introducing pipe passage 102 opens in atmospheric air below the second check valve 103. Accordingly, even when water enters the inside of the atmospheric air introducing pipe passage 102 through an atmospheric air open end of the atmospheric air introducing pipe passage 102, it is possible to make water which enters the atmospheric air introducing pipe passage 102 difficult to reach the second check valve 103. The filter 104 is interposed on the atmospheric air introducing pipe passage 102 at a position closer to the atmospheric air open side than the second check valve 103 and hence, dusts hardly adhere to the second check valve 103. Further, the filter 104 is interposed on a part of the atmospheric air introducing pipe passage 102 which has a downward gradient toward the atmospheric air open side and hence, even when the filter 104 is wetted with water, it is possible to drain water toward the atmospheric air open end side from the filter 104.

On the tank cover 44 which covers the fuel tank 42 from above and includes the opening part 79 in which the fuel filling port 67 formed in the upper surface of the fuel tank 42 upwardly faces, the bulging part 80 which receives a load from the rider's seat 40 and dams up fuel overflown to the outside of the opening part 79 at the time of filling fuel to the fuel filling port 67 from above is formed in an upwardly bulging manner, and the second check valve 103 is arranged below the bulging part 80. Accordingly, the second check valve 103 is arranged at a high position and hence, it is possible to make water which enters the inside of the atmospheric air introducing pipe passage 102 more difficult to reach the second check valve 103.

The charge pipe passage 84 includes: the first engine-side pipe passage part 84e which is arranged above the engine body 19 in a vertically extending manner on one side in the vehicle widthwise direction (left side in this embodiment) of the engine body 19; the second engine-side pipe passage part 84f which is connected to the lower end of the first engine-side pipe passage part 84e on the one side in the vehicle widthwise direction and extends from the one side to the other side in the vehicle widthwise direction (right side in this embodiment) above the engine body 19; and the third engine-side pipe passage part 84g which is connected to the second engine-side pipe passage part 84f on the other side in the vehicle widthwise direction and is connected to the engine body 19. Accordingly, it is possible to suppress the flow out of oil in the engine body 19 to the inside of the charge pipe passage 84 when the motorcycle falls.

Further, the frame-side support part 110 which supports the first engine-side pipe passage part 84e is mounted on the vehicle body frame F, the engine-side support part 111 which supports the second engine-side pipe passage part 84f is mounted on the shroud 25 of the engine E, and at least a part of the charge pipe passage 84 between the engine-side support part 111 and the frame-side support part 110 is formed of the elastic tube 97 and hence, the charge pipe passage 84 can follow the swing of the engine E.

The second engine-side pipe passage part 84f is arranged so as to pass below the intake device 28 which extends rearwardly from an upper side surface of the cylinder head 22 of the engine body 19 and hence, a part of the charge pipe passage 84 can be arranged by making use of a dead space below the intake device 28.

The engine-side support part 111 is mounted on the engine E at a position closer to one side in the vehicle widthwise direction than the intake device 28 as viewed in a plan view. Accordingly, a part of the charge pipe passage 84 which passes below the intake device, that is, the second engine-side pipe passage part 84f can be fixed such that the second engine-side pipe passage part 84f does not swing relative to the engine body 19 and hence, the intake device 28 can be arranged close to the engine body 19 while obviating the contact of the intake device 28 with the charge pipe passage 84 thus contributing to making the engine E compact.

The vehicle body frame F includes the pair of left and right seat frames 15 . . . which have the inclined parts 15a . . . extending rearwardly and upwardly respectively, the power unit P is swingably supported on the vehicle body frame F below the seat frames 15 . . . , and the frame-side support part 110 is arranged at an oblique rearward and upward position from the engine-side support part 111 and is mounted on the inclined part 15a of the seat frame 15 on one side in the vehicle widthwise direction (left side in this embodiment) out of both seat frames 15 . . . . Accordingly, the engine-side support part 111 and the frame-side support part 110 can be arranged in a spaced-apart manner from each other in the longitudinal direction and hence, a diffraction amount of the elastic tube 97 caused by the swing of the power unit P can be made small.

Further, the second cross member 38 is provided between the pair of seat frames 15 . . . behind the frame-side support part 110, the fuel tank 42 which is arranged behind the second cross member 38 is supported on the both seat frames 15 . . . , and the charge pipe passage 84 includes the communication pipe passage part 84d which is communicably connected to the upper end of the first engine-side pipe passage part 84e on one side in the vehicle widthwise direction, extends toward the other side in the vehicle widthwise direction along the second cross member 38, and is connected to the fuel tank 42. Accordingly, the flowout of oil into the inside of the charge pipe passage 84 from the engine body 19 side can be more effectively suppressed.

Although the embodiment of the present disclosure has been explained heretofore, the present disclosure is not limited to the above-mentioned embodiment, and various design modifications may be made without departing from the gist of the present disclosure described in Claims.

For example, the invention described in Claim 1 to 7 is also applicable to a motorcycle where a canister which constitutes the fuel absorption means is arranged below the upper surface of the fuel tank 42.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An evaporated fuel treatment device for a motorcycle comprising:
    an engine which generates power for driving a rear wheel;
    a fuel tank which stores fuel to be supplied to the engine;
    a fuel absorption means which is arranged outside the fuel tank and below an upper surface of the fuel tank which absorbs a fuel gas evaporated in the fuel tank; and
    a charge pipe passage which introduces a fuel gas to the fuel absorption means from the fuel tank, wherein
    the charge pipe passage includes a first tank-side pipe passage part which is connected to the upper surface of the fuel tank, and a second tank-side pipe passage part which is connected with the first tank-side pipe passage part and extends toward an opposite side of the fuel tank in the vehicle widthwise direction,
    wherein the first tank-side pipe passage part and the second tank-side pipe passage part are fixed to the upper surface of the fuel tank.

2. The evaporated fuel treatment device for a motorcycle according to claim 1, wherein the first tank-side pipe passage part extends toward the one side of the fuel tank from a connection part connected to the upper surface of the fuel tank in the vehicle widthwise direction, and is connected to the second tank-side pipe passage part.

3. The evaporated fuel treatment device for a motorcycle according to claim 2, wherein a fuel filling port is formed in the upper surface of the fuel tank on a side of the vehicle in the widthwise direction, wherein the first tank-side pipe passage part, which is connected to the upper surface of the fuel tank at a position offset from the fuel filling port, and the second tank-side pipe passage part, are connected to each other in a state where the first tank-side pipe passage part and the second tank-side pipe passage part surround the periphery of the fuel filling port.

4. The evaporated fuel treatment device for a motorcycle according to claim 3, wherein a tray which receives fuel spilt from the fuel filling port is arranged around the fuel filling port, and a part of the first tank-side pipe passage part and a part of the second tank-side pipe passage part are arranged to pass below the tray.

5. The evaporated fuel treatment device for a motorcycle according to claim 1, wherein the charge pipe passage includes a third tank-side pipe passage part which is connected to the second tank-side pipe passage part on a side of the fuel tank in the vehicle widthwise direction and has a highest part arranged at a highest position of the charge pipe passage at an intermediated position thereof.

6. The evaporated fuel treatment device for a motorcycle according to claim 5, wherein a part of the third tank-side pipe passage part which includes at least the highest part, is formed of an elastic tube, and the highest part of the elastic tube is supported on a highest part support part mounted on the fuel tank from below.

7. The evaporated fuel treatment device for a motorcycle according to claim 5, wherein a part of the charge pipe passage ranging from the highest part to the connection part connected to the fuel tank is arranged with a downward gradient toward the connection part.

8. The evaporated fuel treatment device for a motorcycle according claim 5, wherein the fuel absorption means is a crankcase which stores oil for absorbing the fuel gas and constitutes a part of the engine,
    wherein a downstream end of the charge pipe passage is connected to the crankcase in a state where the downstream end of the charge pipe passage opens in the oil, and wherein a first check valve which prevents a backflow of a fuel gas toward the fuel tank is interposed on the charge pipe passage downstream of the highest part in a state where the first check valve is supported on the fuel tank.

9. The evaporated fuel treatment device for a motorcycle according to claim 8, wherein the upper surface of the fuel tank includes a higher part in which the fuel filling port is formed and a lower part lower than the higher part, and wherein the first check valve is arranged on the lower part.

10. The evaporated fuel treatment device for a motorcycle according to claim 9, wherein the lower part is formed in a downwardly inclined manner toward a crankcase side.

11. The evaporated fuel treatment device for a motorcycle according to claim 8, wherein an atmospheric air introducing pipe passage which introduces atmospheric air to the inside of the fuel tank is connected to a branch part which is formed on the charge pipe passage at a position closer to a fuel tank side than the first check valve, and
    wherein a second check valve which prevents the flow of fuel from the fuel tank side is interposed on the atmospheric air introducing pipe passage.

12. The evaporated fuel treatment device for a motorcycle according to claim 1, wherein a part of an elastic tube which constitutes at least a part of the charge pipe passage and is arranged above the fuel tank is held by an upper open clamper which is mounted on the upper surface of the fuel tank, and
    wherein the fuel tank is covered with a tank cover which prevents the removal of the elastic tube from the upper open clamper from above.

13. The evaporated fuel treatment device for a motorcycle according to claim 1, wherein paint treatment is applied to an outer surface of the fuel tank, and a metallic pipe which constitutes a part of the charge pipe passage is fastened to the fuel tank.

* * * * *